A. HOLBROOK, Jr.
Machine for Sewing Books.
No. 87,258.
2 Sheets—Sheet 1.
Patented Feb. 23, 1869.
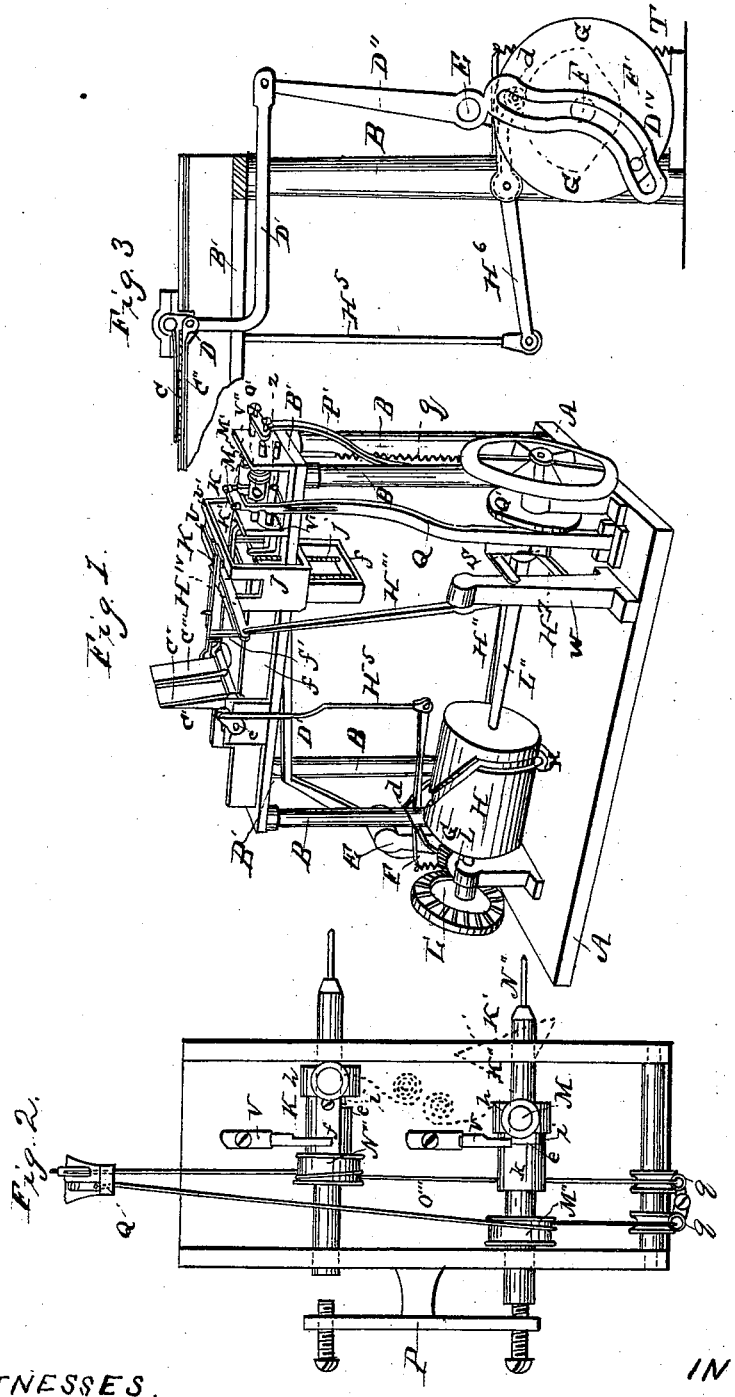
WITNESSES
INVENTOR.
Amos Holbrook A. HOLBROOK, Jr.
Machine for Sewing Books.
No. 87,258.
2 Sheets—Sheet 2.
Patented Feb. 23, 1869.
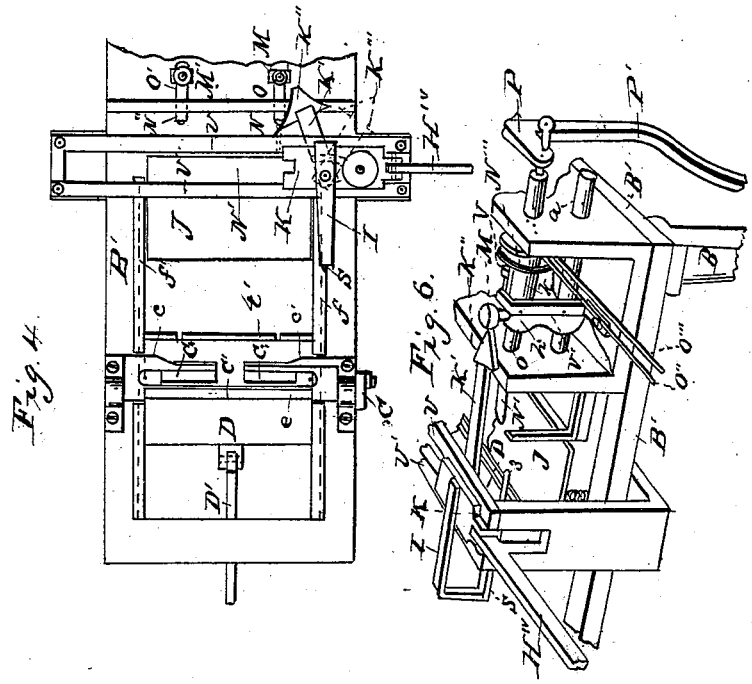
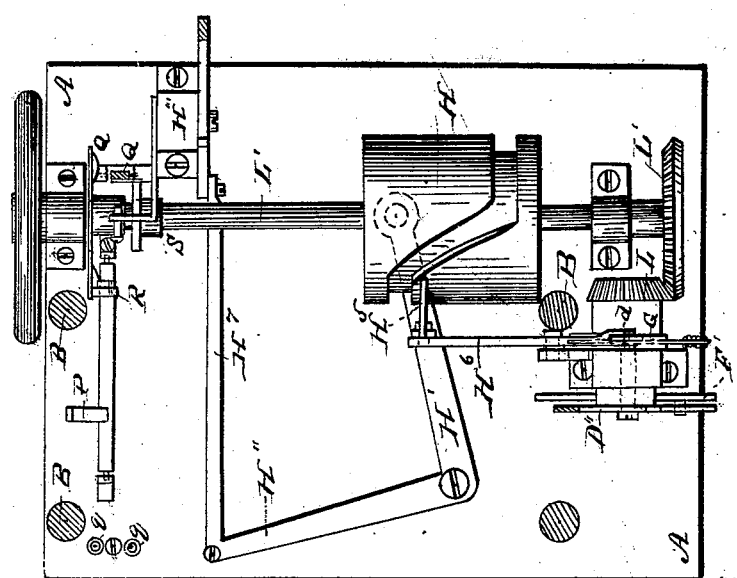

UNITED STATES PATENT OFFICE.

AMOS HOLBROOK, JR., OF LYNN, MASSACHUSETTS.

IMPROVEMENT IN MACHINES FOR SEWING BOOKS.

Specification forming part of Letters Patent No. 87,258, dated February 23, 1869.

*To all whom it may concern:*

Be it known that I, AMOS HOLBROOK, Jr., of Lynn, in the county of Essex and State of Massachusetts, have invented a Machine for Sewing Books; and I do hereby declare that the following is a full and exact description thereof, reference being had to the accompanying drawings, and to the letters of reference marked thereon.

To enable others skilled in the art to make and use my invention, I will proceed to describe its nature, construction, and operation.

The nature of my invention consists in combining with a series of sewing-needles actuating devices, in such a manner that if signatures of a book be passed to the machine while the same is in operation they will be taken and carried into the machine, properly adjusted, and securely sewed to each other.

The several movements and their actuating devices are of such a complicated nature that they can only be understood by inspection of the specification and drawings.

In the drawings, Figure 1 is a perspective view of my machine. Figure 2 is a plan, showing the needles, bars, and their adjuncts, drawn full size. Figure 3 is an elevation, showing the "feeder" and "traveler" movement, the view being taken from the rear of the machine, as shown in perspective. Fig. 4 is a plan, showing the feeder, traveler, thread-carrier, &c. Fig. 5 is a plan, showing the movements that are more immediately connected with the base of the machine. Fig. 6 is an enlarged perspective view, showing the needle-movement.

In the drawings, A, B B B B, B' B' represent the base, standards, and table of my machine, to which the working parts are attached by the various devices shown. L'', Figs. 1 and 5, is the main shaft of the machine, to which is attached the cam-barrel H, which, operating through the bent lever $H^i$ $H^{ii}$, the link $H^7$, the lever $H^{iii}$, and the link $H^{iv}$, actuates the thread-carrier I. The shaft L'' also carries the cams Q' and S and the gear L'.

The gear L, Figs. 1 and 5, is attached to a short shaft, which carries the cam G, a small part of which is shown in Figs. 1 and 5, and is indicated more plainly by dotted lines in Fig. 3. This cam G G, Fig. 3, acts on the end $d$ of the lever $H^6$, Figs. 1 and 3, which, acting through the link $H^5$ and the crank C, Fig. 1, actuates the feeder C' C'' C'''—that is, throws it into the perpendicular position shown in Fig. 1, or holds it horizontal, as shown in Fig. 3. This feeder consists of two plates or leaves, the upper one of which, C', is whole, while the lower one, C'' C''', is divided into two parts, the upper plate, C', being attached to the shaft, $c$, Fig. 4, while the leaves forming the lower plate are attached to two prongs, $c'$ $c''$, extending from the shaft $c$, so that when the feeder assumes the horizontal position shown in Fig. 3 the traveler D may pass through between the upper and lower leaves of the feeder, and thus take from the feeder the signature which may have been previously placed upon it. This will be more fully explained in the use of the machine.

The traveler D, Figs. 3 and 4, is a plate of metal, which slides from the rear ends of the ways $f f'$, Figs. 1 and 4, through the feeder, when the same is horizontal, as represented in Fig. 3, nearly to the points of the needles N' N'', Fig. 4.

The traveler D is actuated by a crank-pin, $D^{iv}$, Fig. 3, which, working in the slot of the lever $D^{ii}$, actuates the link $D^i$, and, through it, the traveler.

$t$ $t'$, Fig. 4, are small slots or channels cut into the front edge of the traveler D. These slots correspond in number and position with the needles, so that when the traveler is at the end of its forward stroke, and is holding a signature while being sewed, the needles may pass through the back of the signature into these slots far enough to hook onto the parallel thread.

J, Figs. 1, 4, and 6, is a table, supported by springs $j j$, which rest upon the hanger J', Fig. 1. This table supports the signatures which have been sewed together.

O O', Figs. 1 and 2, are short rods, which we will call "needle-bars," holding the needles N' N''. These needle-bars have a compound motion—that is, they slide longitudinally and revolve on their own axes.

These needle-bars are moved forward by the lever P', Figs. 1 and 6, which is attached to a rocker-shaft, R', Fig. 5, which is operated by a vertical arm, R, the said arm R being moved by a cam, Q'', on the face of the disk Q', and are moved back by the swinging incline K'', Figs. 4 and 6. This incline is attached to the slide K by the bar K', and traverses with it. K' is attached to the slide K by a pivot and by a pin and slot, in such a manner that it may swing a limited distance, as shown by the dotted lines K''', Fig. 4.

Each needle-bar works through a collar, $h$, Figs. 2 and 6, which is attached to a bar, $a$, immediately under the needle-bar.

The collar $h$ is permanently attached to $a$, and slides freely back and forth with it, but is held back by the springs $g$ $g'$, Fig. 2, when not forced forward by other parts of the machine.

Each needle-bar has affixed to it a barrel, $k$, and pulley N''', Fig. 6.

Around the pulley N''' a band or cord, O'', passes, one end of said cord being attached to a spiral spring, $q$, Fig. 2, while the other end is attached to the lever Q. This cord, when operated by the lever Q, will cause the needle-bar, and consequently the needle itself, to revolve.

A pin, $i$, Fig. 2, inserted in the collar $h$ serves as a stop, against which a shoulder, $e$, made in the barrel $k$ strikes. Thus the revolution of the needle is limited to a half-turn.

The needle N' is represented in Fig. 2 as being right side up—that is, ready to receive the thread. The needle N'' is represented as bottom side up, and as withdrawn from the work.

V' V'', Figs. 2 and 6, are arms, so arranged that when the needles are properly revolved and pushed forward the knobs V, Figs. 2 and 6, attached to the needle-bar, will come in contact with them, (the said arms,) and thus the needle-bar will be prevented from revolving until it has been pushed back by the incline K'' sufficiently far for the knob V to clear the arm V'.

The lever Q, Figs. 1, 2, and 5, operates the cords O'' O''', said cords being reacted upon by the springs $q$ $q$. The lever itself is operated by the wild-cat cam S, Fig. 5.

To use my invention as a single-thread machine I proceed as follows: I place a spool of suitable thread on a standard at $r$, Fig. 4, on the slide K, and thread the carrier by passing the thread through the small stud $s$, Fig. 4, and through the perforations $s'$ $s''$, Fig. 6. If, now, the machine is started and the signature is fed in, it will proceed to sew the different signatures together, and to deposit them as fast as sewed upon the table J.

The process of feeding in the signatures and forming the stitches is as follows: Whenever the feeder C' C'' C''', Fig. 1, assumes the upright position shown in Fig 1, the operator places a signature of a book upon it, one fold of each signature being upon either side of it. At the next motion of the machine the feeder assumes the horizontal position shown in Fig. 3, and the traveler D passes in between the plates of the feeder, and consequently within the fold of the signature, and the traveler continues to advance until it has carried the signature nearly to the points of the needles N' N'', Fig. 4. The traveler, with the signature, now becomes stationary, and remains so until the needles have had time to enter the saw-scarf previously made in the back of the signature, and the thread-carrier has passed the thread within the fold of the signature, laying the thread on the hooks of the needles, and until the needles have hooked onto the said thread and have withdrawn themselves from the signature. Now the traveler retires, leaving the signature on the table J, and takes from the feeder a second signature, which is in its turn passed forward to the needles, then becoming stationary. The needles still holding the loop of the previous signature again pass forward into the new signature, and take the thread of this signature, as before described in the case of the first one, and draw it through the loops previously formed on the needles. Now, as the needles withdraw they make a half-turn, and thus cast off the first loop. As the traveler D is passed forward again the needles are revolved, so that the hook is on the upper side ready to enter the succeeding signature. The taveler now again retires, leaving the second signature, together with the first, on the table J. The next and succeeding signatures undergo the process above described for the second signature until the book is complete.

Having thus described my invention, I will now proceed to set forth my claim.

What I claim as my invention, and desire to secure by Letters Patent of the United States, is—

1. The traveler D, in combination with the feeder C' C'' C''', constructed and working substantially as described, and for the purpose set forth.

2. So arranging the feeder and its adjuncts that the feeder will automatically vibrate from a horizontal to a vertical position, substantially as described, and for the purpose set forth.

3. The combination of the traveler D, needles N' N'', and thread-carrier I, working substantially as described, and for the purpose set forth.

4. The combination and arrangement of the feeder C' C'' C''', the traveler D, the thread-carrier I, and needles N' N'', working substantially as described, and for the purpose set forth.

5. The combination and arrangement of the thread-carrier I and traveler D, working as herein described, and for the purpose set forth.

AMOS HOLBROOK, JR.

Witnesses:
A. HUN BERRY,
J. M. ATTWILL.